(12) United States Patent
Mueller

(10) Patent No.: US 10,200,211 B2
(45) Date of Patent: Feb. 5, 2019

(54) ENERGY-SAVING OPERATION OF A COMMUNICATION SYSTEM

(71) Applicant: Robert Bosch GmbH, Stuttgart (DE)

(72) Inventor: Andreas Mueller, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 115 days.

(21) Appl. No.: 15/119,227

(22) PCT Filed: Feb. 9, 2015

(86) PCT No.: PCT/EP2015/052609
§ 371 (c)(1),
(2) Date: Aug. 16, 2016

(87) PCT Pub. No.: WO2015/124451
PCT Pub. Date: Aug. 27, 2015

(65) Prior Publication Data
US 2017/0012797 A1    Jan. 12, 2017

(30) Foreign Application Priority Data
Feb. 20, 2014    (DE) .......................... 10 2014 203 072

(51) Int. Cl.
*H04L 12/403*    (2006.01)
*H04L 12/12*    (2006.01)
(Continued)

(52) U.S. Cl.
CPC .......... *H04L 12/4035* (2013.01); *H04L 12/12* (2013.01); *H04L 12/40039* (2013.01); *H04L 12/417* (2013.01); *Y02D 50/40* (2018.01)

(58) Field of Classification Search
None
See application file for complete search history.

(56) References Cited

U.S. PATENT DOCUMENTS

2009/0325533 A1* 12/2009 Lele ...................... G06F 1/3209
455/343.1
2012/0137034 A1* 5/2012 Kaneko ................. G06F 13/376
710/110
(Continued)

FOREIGN PATENT DOCUMENTS

| DE | 102011084740 | 4/2013 |
| WO | 2010119370 | 10/2010 |
| WO | 2013167679 | 11/2013 |

OTHER PUBLICATIONS

International Search Report for Application No. PCT/EP2015/052609 dated Apr. 23, 2015 (English Translation, 2 pages).

*Primary Examiner* — Alex Skripnikov
(74) *Attorney, Agent, or Firm* — Michael Best & Friedrich LLP

(57) ABSTRACT

The invention relates to a method for operating a communication system (100) having a plurality of communication units (300, 301, 302, 303, 304) which are connected to a communication medium (110), wherein access to the communication medium (110) is granted to the communication units (300, 301, 302, 303, 304) in a predefined order, wherein, after the end of a standby mode, a communication unit (300, 301, 302, 303, 304) checks whether it is granted access and changes to the standby mode again for a pause duration (T1, T2) until access is likely to be granted to it again if the communication unit (300, 301, 302, 303, 304) does not require access to the communication medium (110) or is not granted access.

16 Claims, 4 Drawing Sheets

(51) Int. Cl.
*H04L 12/40* (2006.01)
*H04L 12/417* (2006.01)

(56) References Cited

U.S. PATENT DOCUMENTS

2013/0185571 A1\* 7/2013 Gallagher ........ H04N 21/43615
                                                                                 713/320
2014/0247837 A1   9/2014 Blaschke et al.
2015/0100712 A1\* 4/2015 Sengoku ................. G06F 13/28
                                                                                 710/110

\* cited by examiner

ENERGY-SAVING OPERATION OF A COMMUNICATION SYSTEM

BACKGROUND OF THE INVENTION

The present invention relates to a method for operating a communication system, particularly in order to reduce power consumption.

Possible communication systems comprise a plurality of communication units or nodes, usually a central instance (also called a "master" or "coordinator") and a commonly used communication medium (also referred to as a "common transmission medium" or "shared medium").

A fundamental problem in a communication system of this type is the control of access to the shared medium, since, with simultaneous use of the same resources by different nodes, a successful (i.e. error-free) transmission is impossible. There are a multiplicity of different degrees of freedom and possible forms, and also many different directions of optimization, for example in terms of throughput, fairness, real-time capability, etc.

A distinction can generally be made between contention-based and coordinated media access methods.

In the case of contention-based methods, it may essentially occur that two or more nodes wish to access the shared medium simultaneously and transmit corresponding data, which then results in a collision on the common transmission medium. Examples of this type of method are (Slotted) ALOHA, Carrier Sense Multiple Access (CSMA) and CSMA with collision detection (CSMA/CD), used, inter alia, in the Ethernet variants 10BASE5 and 10BASE2.

Unlike contention-based methods, in coordinated media access methods no collisions due to simultaneous access should occur in the error-free case. Media access can be coordinated statically, such as e.g. in the case of static time division multiplex methods in which each node is allowed exclusively to use the shared medium periodically for a certain time for transmission. This can be done, for example, using a statically defined schedule which is known to all nodes, in conjunction with a time synchronization of all nodes. Alternatively, the coordination can be implemented using a control by a central instance, such as, for example, in the case of a conventional polling method. In addition, however, a distributed coordination is possible, as used e.g. in methods such as "Token Ring" or "Token Bus".

Reducing the energy consumption of individual nodes in a communication of this type is generally a major concern. This conventionally applies, in particular, to wireless communication systems (e.g. wireless sensor networks), since individual nodes are often battery-operated here or even operate energy harvesting, i.e. they obtain their energy from the environment itself.

This obviously applies in principle to wired systems also, for example if individual nodes are to be supplied with power via the communication line or generally power consumption is to be minimized e.g. in order to reduce operating costs.

The fundamental idea of most approaches is normally that a node switches back and forth between a normal operating mode in which it is fully functional and one or more special sleeping modes, also generally referred to below as standby mode, with restricted functionality. A node in a sleeping mode could thus disable all functions, apart from a timer for switching back to the normal operating mode, including all communication functions, so that the node is not operable in this mode.

Different possible approaches are, for example, as follows:

A node can be woken up, for example, by means of an external triggering by applying a specific (electric) signal. A possible application for this is e.g. a switch which must transmit a corresponding mode change to a different mode (e.g. a gateway or central controller) only in the event of changes in the switching state.

A switchover between operating modes periodically in a fixed pattern is one option, particularly for communication systems in which, for example, a specific beacon frame is transmitted periodically, after which transmissions can take place in a targeted manner, or with which pending transmissions can be announced, or for communication systems with a fixed timing pattern in which e.g. fixed-size timeslots are defined and at least one timeslot is allocated to each node. In this case, a node could thus readily be in sleeping mode outside its timeslots.

From DE 10 2011 084 740 A1, for example, a method for data transmission is known in which a data packet is divided up into a header and a payload for energy reduction, wherein the header is transmitted in a less complex mode than the payload.

The object of the present invention is to provide a communication method for a communication system which enables flexible switchovers between operating modes and long time durations in an energy-saving mode, and which has the most efficient possible energy consumption.

SUMMARY OF THE INVENTION

In a method according to the invention for operating a communication system, in particular a wireless or wired communication system, which has a plurality of communication units which are connected to a communication medium, the communication units are granted access in a predefined sequence. After the end of a standby mode, a communication unit checks whether it is granted access and switches later, where relevant after access, to a standby mode once more for a pause duration until it is likely to be granted access again, i.e. the next time, if the communication unit does not require access to the communication medium or it is not granted access. The communication unit does not require access to the communication medium if it does not wish to transmit data or after it has transmitted all data.

Within the scope of the invention, each communication unit can thus switch to a standby mode for a foreseeable pause duration in which it will not in any case obtain access to the communication unit in order to save energy in this way. This enables a shutdown for each of the communication units individually. The pause duration can thus last as long as possible, resulting in the greatest possible energy-saving. Furthermore, due to the decentralized structure, the method offers a high flexibility. Moreover, it is guaranteed that the communication unit will no longer be in standby mode when it is likely to be granted access to the communication medium for the next time according to the sequence, but can nevertheless save energy for the longest possible pause duration.

Since it cannot be predetermined with certainty how many communication units will access the communication system for how long (access duration), it may occur that the communication unit is not yet granted access when it ends its standby mode, but rather a different communication unit is next in line. In this case, the communication unit is not granted access and can again switch to standby mode in order to further save energy. It is taken into account, in particular, when the communication unit is likely to be granted access again. These steps can preferably be repeated by the communication unit for as long as the determined pause duration is greater than a predetermined threshold value, since a switchover to standby mode would, for example, no longer be efficient. The total time in standby mode of the communication unit can thus be designed to be as long as possible.

Furthermore, a possible service life of a communication unit can thereby be increased if said unit is, for example, battery-powered. An increase in energy efficiency can also result in an improvement in the carbon footprint. A simple and economical support of energy harvesting is thus also provided. If, for example, less energy is consumed, costs are also reduced.

The communication unit preferably accesses the communication medium when it is granted access according to the sequence and then switches back to standby mode for the pause duration. Each communication unit can thereby individually access the communication medium and indeed, in particular, for any given access duration. The communication unit is particularly flexible as a result.

In addition, the communication system advantageously comprises a control unit. The communication unit is then granted access to the communication medium by means of a polling message from the control unit, again according to the predefined sequence. The communication unit can either accept the access or reject it by means of a response message. Similarly, the communication unit can also allow a response duration to expire, with which it is recognizable that no access is required. As a result, the method can also be used for communication systems which comprise a control unit and, in particular, are also controlled by the latter.

It is advantageous if a unit-specific and/or a unit-independent offset is taken into account in determining the pause duration. Deactivation and/or activation times, for example, of a communication unit, which may differ according to the communication unit, can thus be taken into account.

It is particularly advantageous if the pause duration corresponds to a time duration after which the communication unit is again granted access to the communication system according to the sequence, assuming that none of the intermediate communication units accesses the communication medium, i.e. they simply allow a response duration, if specified for them, to expire. This corresponds to the minimum time duration until, at the earliest, the communication unit can again access the communication system.

Alternatively, the pause duration corresponds to a time duration after which the communication unit is again granted access to the communication system, assuming that a specific number of intermediate communication units access the communication system for a predetermined access duration. If, for example, taking account of statistical values, it can be accurately estimated how many communication units are likely to access the communication system for how long, the pause duration during which the communication unit is in standby mode can be optimally increased, whereby more energy can be saved.

Alternatively or additionally, the pause duration is predefined and/or adapted statically or dynamically by the control unit. The communication unit can thus be of flexible design.

The threshold value is preferably adapted statically or dynamically by the control unit. It is thus possible, for example, to respond to different operating types or operating times and the energy saving can be designed to be even more efficient.

It is also advantageous if, when the pause duration is calculated, the communication unit takes account of a time at which the communication unit is likely to receive a message. This is particularly advantageous if the communication unit is also provided to receive messages itself. If it is known when and/or from which other communication unit the communication unit is likely to receive a message, the time of the switchover to standby mode or the pause duration can be adapted or modified accordingly.

A communication unit is also advantageously configured so that the standby mode can be activated (released) and/or deactivated (blocked) by the control unit. An operation of a communication unit that is permanent or persists over a lengthy period may be necessary, for example for safety-related applications. For this purpose, the standby mode of the communication unit would be deactivated by the control unit so that the communication unit does not change to standby mode until a reactivation.

It is furthermore also advantageous if the communication unit switches to standby mode only after receiving a standby message from the control unit. It can thus be provided by the control unit to transmit further messages to the communication units before the latter switches to standby mode.

A processing unit according to the invention, in particular a communication unit, is configured, in particular programmed, to carry out the method according to the invention.

The implementation of the method in the form of software is also advantageous, since this incurs particularly low costs, particularly if an executing control device is also used for other tasks and is therefore already present. Suitable data media for providing the computer program are, in particular, diskettes, hard disks, flash memories, EEPROMS, CD-ROMs, DVDs and the like. A download of a program via computer networks (Internet, Intranet, etc.) is also possible.

The invention is particularly suitable for building automation, wherein the downstream communication units are designed as field devices, such as e.g. sensors and/or actuators. They may, in particular, be smoke and fire detectors, motion detectors, temperature sensors, intruder alarm sensors and corresponding monitoring and control devices.

Further advantages and designs of the invention are set out in the description and the attached drawing.

Obviously, the features described above and still to be explained below are usable not only in the respectively indicated combination, but also in other combinations or in isolation, without exceeding the scope of the present invention.

BRIEF DESCRIPTION OF THE DRAWINGS

The invention is shown schematically on the basis of example embodiments in the drawing and is described in detail below with reference to the drawing.

DETAILED DESCRIPTION

FIG. 1 shows schematically by way of example two different types of communication systems 100 for which a method according to the invention can be used.

Figure 1A:
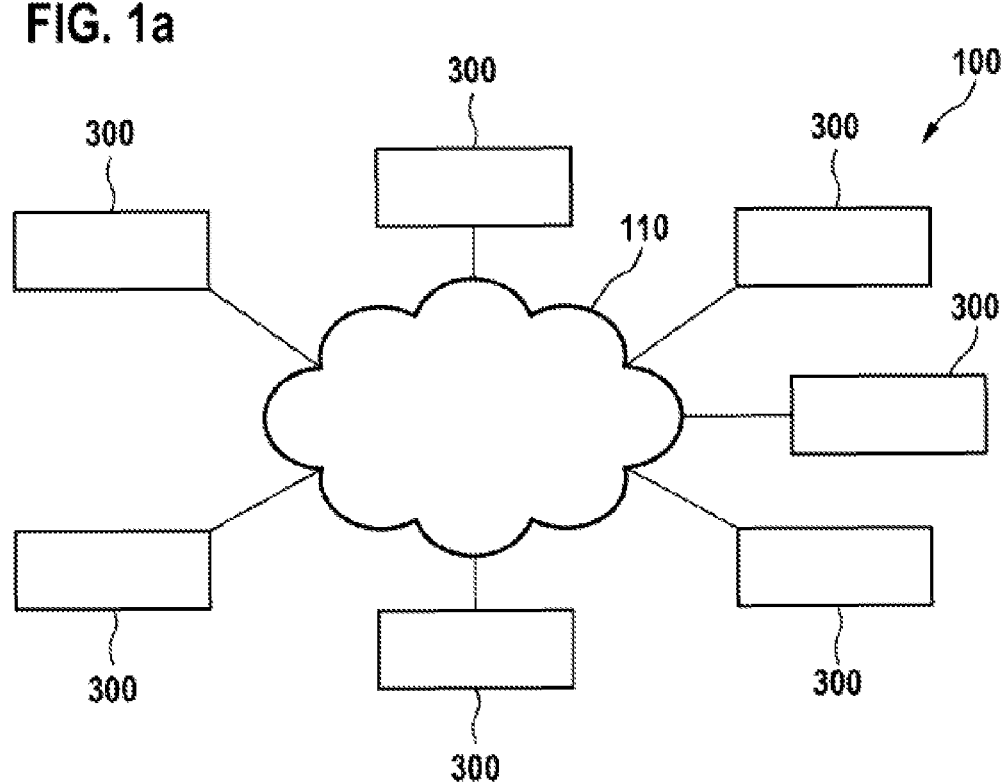
FIG. 1a and FIG. 1b show schematically two preferred designs for a communication system for which a method according to the invention can be used.

The communication system 100 in FIG. 1a has a plurality of communication units 300. A communication medium 110, also referred to as a shared medium, to which the communication units 300 are connected is designed here as a wireless network or medium. This is indicated by the communication medium 110 shown as a cloud.

Figure 1B:
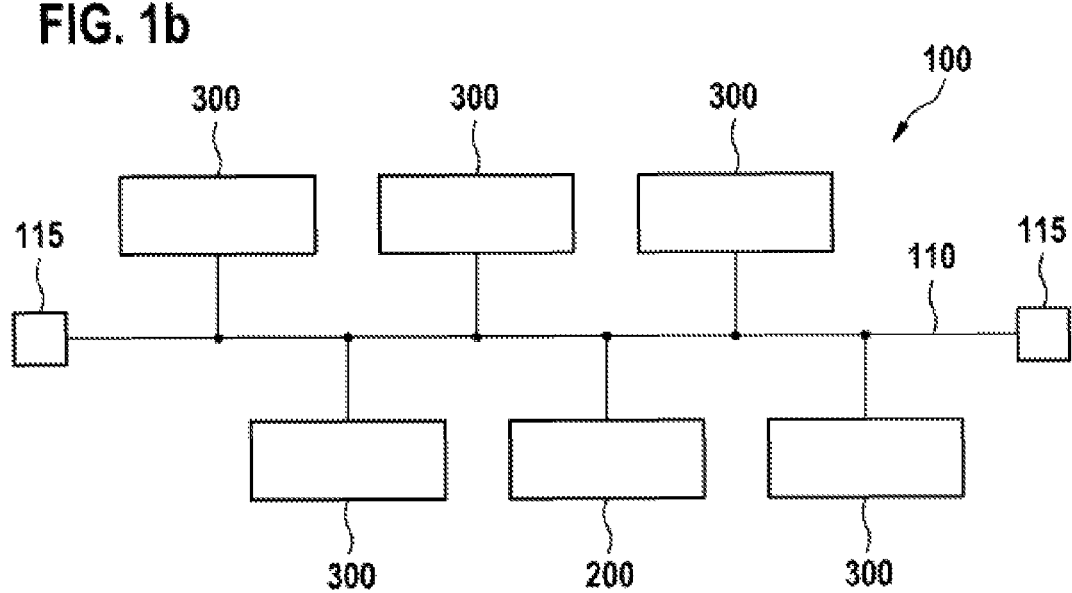

The communication system 100 in FIG. 1b has a control unit 200 and a plurality of communication units 300 which in this case communicate via a communication medium 110 designed as a linear bus. Terminations 115 are furthermore shown here at the ends of the bus.

However, a method according to the invention can also be used for other types of communication system. The two possibilities shown are only by way of example. A control unit can similarly be connected to the wireless medium or not to the linear bus. This depends on the design of the method according to the invention that is used, or the design of the method according to the invention that is used depends on the size of the communication network.

Figure 2:
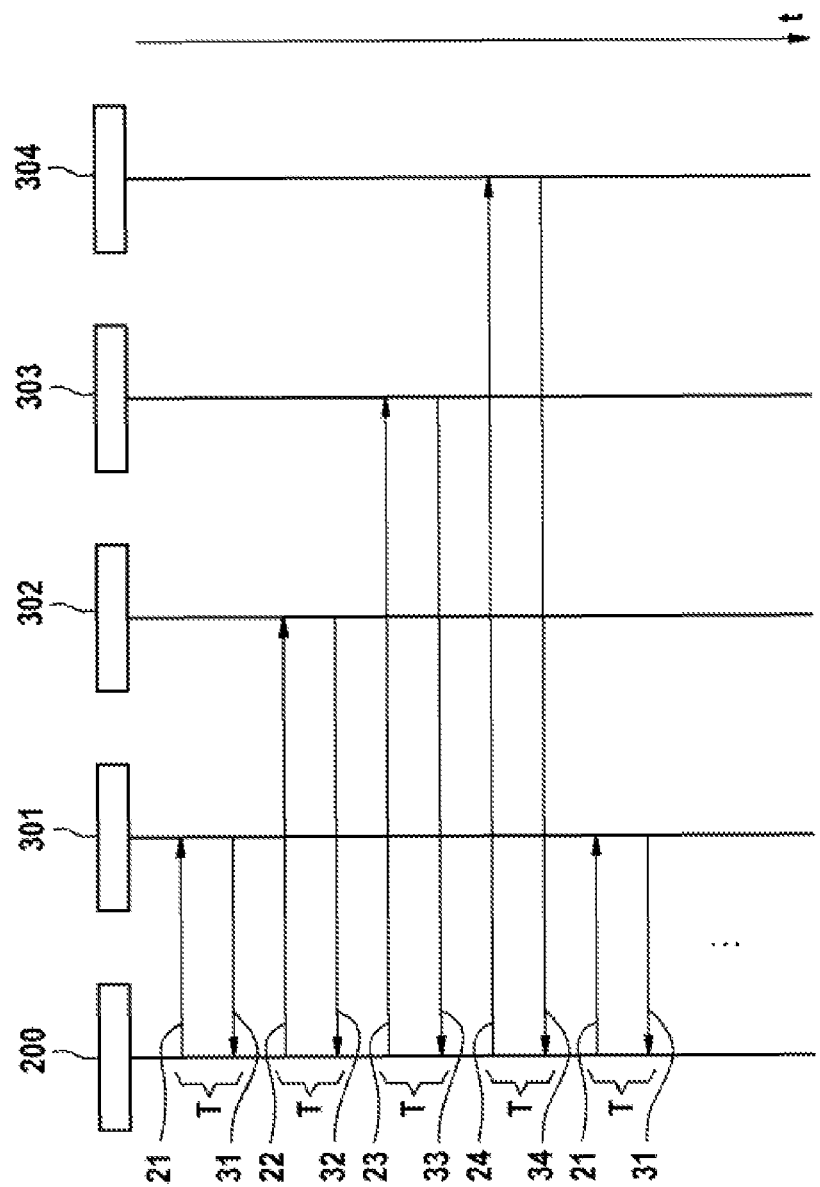
FIG. 2 shows schematically a sequence of a method according to the invention in one preferred design.

FIG. 2 shows schematically a communication according to one preferred design of a method according to the invention between a control unit 200 and four communication units 301, 302, 303, 304. The time t is plotted on the right-hand side in the vertical direction.

For each of the communication units 301, 302, 303, 304, a predetermined response duration T is provided within which a communication unit is granted access to the communication medium, i.e. within which the communication unit is allowed to begin its (possible) access. By way of example, these predetermined response durations for each communication unit 301, 302, 303, 304 are designed as of equal length. However, depending on the application or type of communication unit, these may also have different lengths.

If the communication unit 301, 302, 303, 304 requires data transmission access to the communication medium, it begins, at the end of the response duration T at the latest, with the transmission of a positive response message or even data. The total time duration for which the communication unit is then given access to the communication medium, if the communication unit requires access in order to transmit data, will usually be longer than the response duration T. This depends on the quantity of data that are to be transmitted, cf. FIG. 3 also.

The sequence in which the communication units 301, 302, 303, 304 are granted access is defined as 301, 302, 303, 304. This is also merely by way of example. It is also conceivable for one or more communication units to be granted access several times within one cycle, for example if a communication unit is a safety-critical communication unit. For example, 301, 302, 301, 303, 301, 304 would therefore be conceivable. The communication unit 301 would be granted access here more often within one cycle.

Access is granted here to the communication units 301, 302, 303, 304 by way of example in that in each case they receive a polling message 21, 22, 23, 24 from the control unit. By means of negative response messages 31, 32, 33, 34, the communication units 301, 302, 303, 304 notify the control unit 200 in each case that they do not require access to the communication network. However, it is equally conceivable that the communication units 301, 302, 303, 304 do not send the negative response messages 31, 32, 33, 34, but simply allow the predetermined response duration T in each case allocated to them to expire without any action.

In a communication system without a control unit 200, the communication units 301, 302, 303, 304 would thus receive no polling messages, but would simply allow the response durations T allocated to them to expire. The predetermined response durations of all communication units may, for example, be initially notified to each communication unit. It is equally conceivable for the predetermined response times to be dispatched in each case to the other communication units during an initialization of the communication system, whereby an expansion or reduction of the communication system by communication units is possible.

Figure 3:
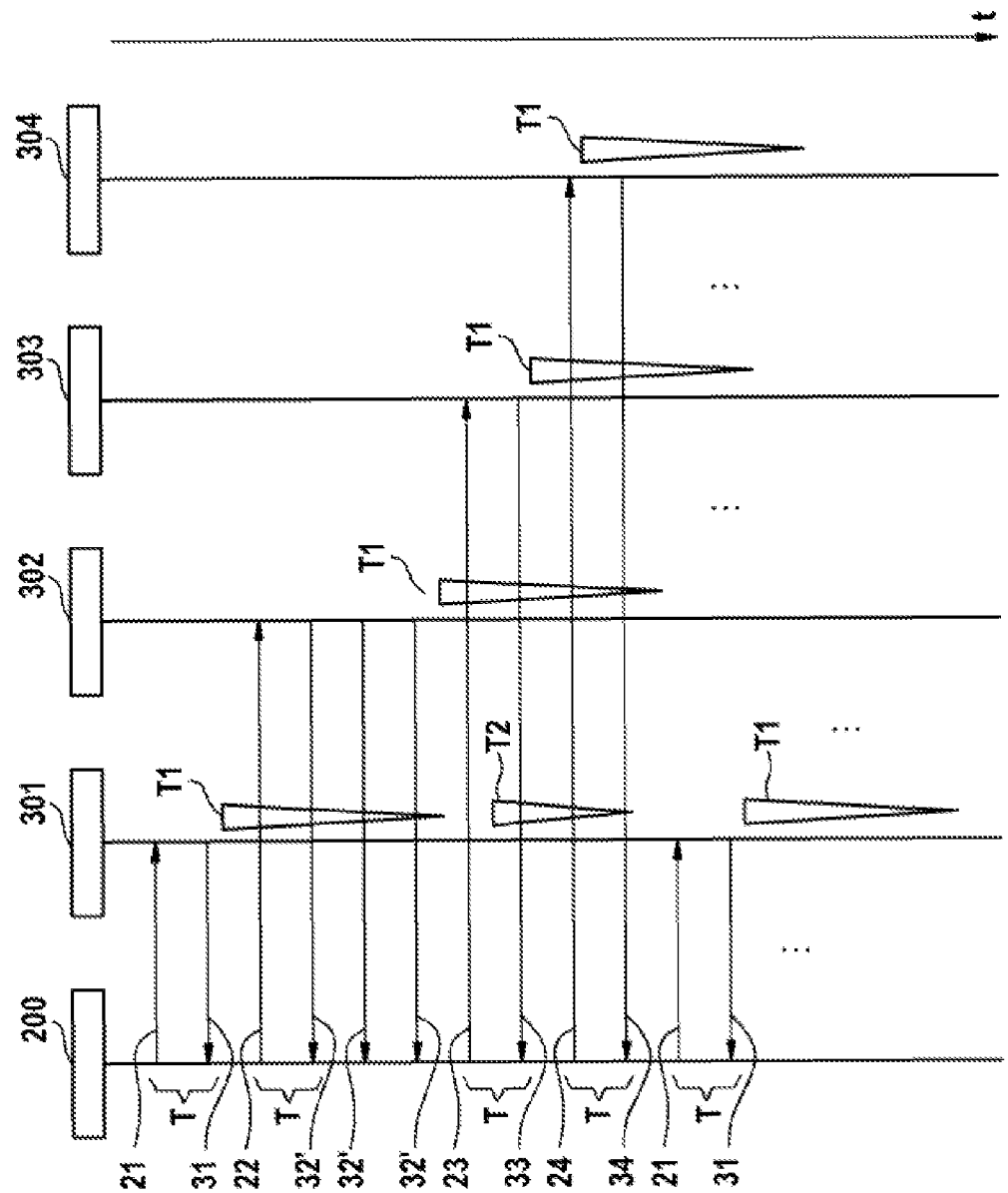
FIG. 3 shows schematically a sequence of a method according to the invention in one preferred design.

FIG. 3 shows schematically a communication according to a preferred design of a method according to the invention between a control unit 200 and four communication units 301, 302, 303, 304. The time t is plotted on the right-hand side in the vertical direction.

As in the example shown in FIG. 2, the communication unit 301 first receives a polling message 21 from the control unit 200, with which it is granted access to the communication medium. With the negative response message 31, the communication unit 301 announces that it does not require access. Following the negative response message 31 and following the expiry of the predetermined response duration T (if the method is carried out without a negative response message 31, simply following the expiry of the predetermined response duration T), the communication unit 301 switches to standby mode for a pause duration T1.

In standby mode, the communication unit is, for example, no longer operable from outside, but only an internal timer is still running, said timer measuring the pause duration and subsequently reactivating the communication unit or ending the standby mode.

The pause duration T1 corresponds to the time duration after which the communication unit 301 is next likely to be granted access, insofar as none of the intermediate communication units requests access and therefore in each case merely uses up the predetermined response duration T. Moreover, an offset for activation and/or deactivation can be taken into account.

It must also be taken into account here that the pause duration T1 for the communication units 301, 302, 303, 304 may differ in each case, since the predetermined response durations T of the respective communication units may also differ in each case. The response durations T1 for all communication units are designed here as of equal length merely by way of example.

The communication unit 302 then receives a polling message 22 from the control unit 200, with which it is granted access to the communication medium. Since the communication unit 302 wishes to access the communication medium, it dispatches a message 32' with useful data to the control unit within its predetermined response time T, with which it is also indicated that further messages with useful data will possibly be dispatched by the communication unit 302.

The communication unit 302 then dispatches two further messages 32' to the control unit. The possible accesses of the following communication units are thus also delayed. The total time duration for which the communication unit 302 has access to the communication medium is longer than the response duration T and depends on the quantity of data to be transmitted. Only subsequently, for example only after an additional waiting time also, the communication unit 302 switches to standby mode for its pause duration T1.

According to the sequence, the communication unit 303 is now granted access to the communication network by means of a polling message 23. Meanwhile, the communication unit 301 ends the standby mode, since its pause duration T1 has elapsed. However, since the communication unit 303 is only granted access at this time because the communication unit 302 has accessed the communication medium, the communication unit 301 can again calculate in advance a pause duration after which, at the earliest, it is again granted access. Since adherence to the predefined sequence is mandatory, the communication unit 304 is also granted access along with the communication unit 303, for which at least the predetermined response duration T is provided each time.

The communication unit 301 can thus again switch to standby mode for a pause duration which is designated this time as T2, since it differs from the preceding pause duration T1.

Neither the communication unit 303 nor the communication unit 304 then require access to the communication medium and thus switch in each case to standby mode for their pause duration T1.

The end of the standby mode of the communication unit 301 thus coincides with the time at which it is granted access. If the communication unit 301 were not yet next in line after the end of the standby mode, it could again calculate a pause duration and again switch to standby mode. This can be repeated for as long as the pause duration is greater than a predetermined threshold value. A threshold value of this type is useful since a switchover to and subsequent ending of the standby mode would no longer be efficient or would not even be possible below a certain pause duration.

An alternative definition for the pause duration T1 could entail an estimate of how many communication units would be likely to access the communication medium for how long (i.e. what access duration). Statistical values, for example, can be used for this purpose. In order to prevent a communication unit from ending the standby mode too late in such a case, i.e. only after it had already been granted access again, an adjustment, for example, can be made by the control unit.

Figure 4:
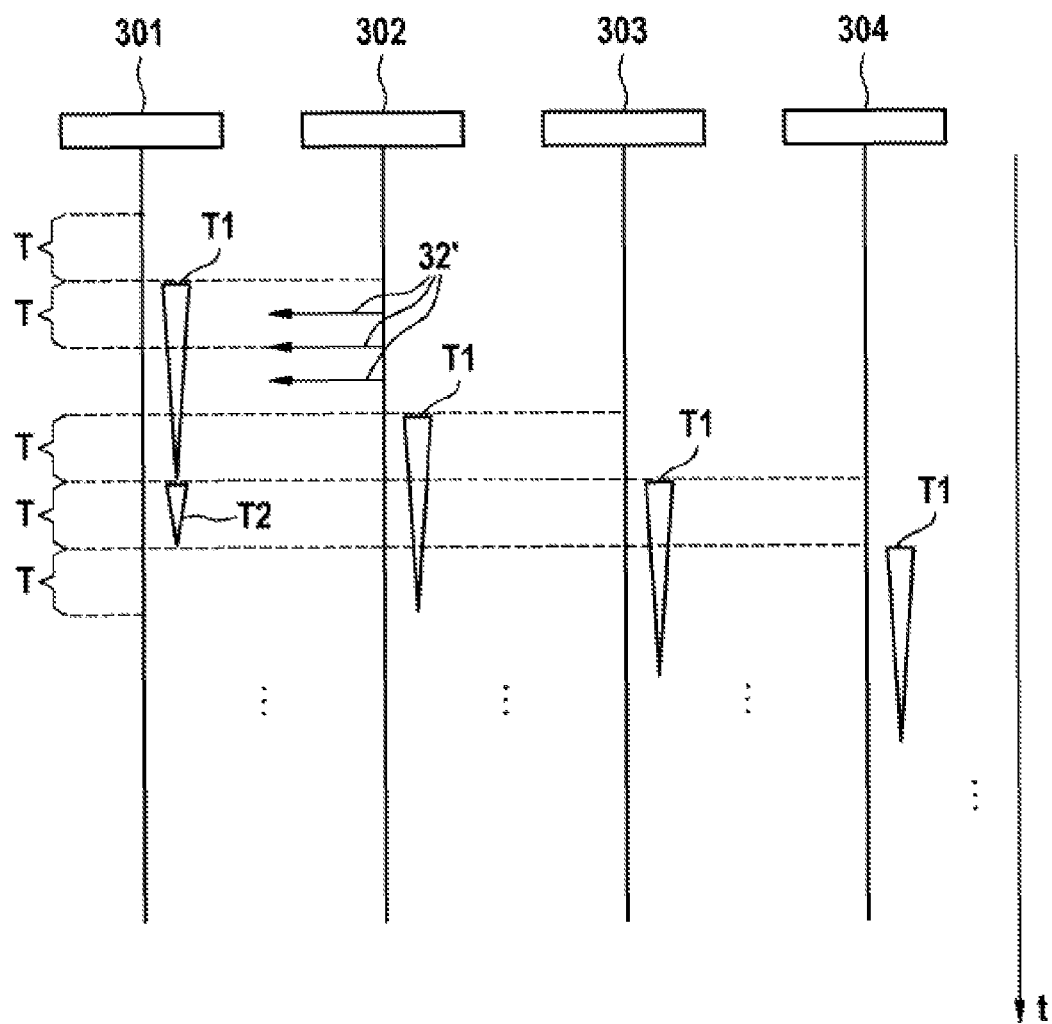
FIG. 4 shows schematically a sequence of a method according to the invention in a further preferred design.

FIG. 4 shows schematically a communication according to a further preferred design of the method according to the invention with four communication units 301, 302, 303, 304. The time t is plotted on the right-hand side in the vertical direction.

As already mentioned, the method can also be used for a communication system without a control unit (or, for example, without involving such a unit). The design of a method according to the invention shown here proceeds in the same way as the design shown in FIG. 3, but with the exception that the communication units 301, 302, 303, 304 do not receive the polling messages 21, 22, 23, 24 and therefore themselves determine when they are granted access. To do this, the communication units can monitor the communication on the communication medium and thus establish which communication unit currently has access. On the basis of the predefined sequence, each communication unit can thus determine when it is next in line. Similarly, the negative response messages 31, 32, 33, 34 are not dispatched since no control unit is present to receive them.

The predetermined response durations and the predetermined sequence of all communication units may, for example, already be predefined for each communication unit, as initially mentioned in the prior art also. It is similarly conceivable for the predetermined response durations to be dispatched in each case to the other communication units during an initialization of the communication system, whereby an expansion or reduction of the communication system by communication units is possible.

The invention claimed is:

1. A method for operating a communication system which has a plurality of communication devices which are connected to a communication medium, the method comprising:
granting the communication devices access to the communication medium in a predefined sequence, wherein, after the end of a standby mode, each of the plurality of communication devices checks whether it is granted access to the communication medium, wherein the respective communication device does not request access to the communication medium; and
switching the respective communication device to the standby mode for a pause duration until the respective communication device is likely to be granted access to the communication medium again, when the respective communication device does not require access to the communication medium or the respective communication device is not granted access to the communication medium, wherein the pause duration corresponds to a time duration after which the respective communication device is granted access to the communication medium according to the predefined sequence if a predetermined number of other communication devices of the plurality of communication devices access the communication medium.

2. The method as claimed in claim 1, wherein the respective communication device, when it is granted access to the communication medium, accesses the communication medium and thereafter switches back to the standby mode for the pause duration.

3. The method as claimed in claim 1, wherein a device-specific offset or a device-independent offset is taken into account in determining the pause duration.

4. The method as claimed in claim 3, wherein the pause duration is controlled by the control unit.

5. The method as claimed in claim 3, wherein the standby mode of the respective communication device is controlled by the control device.

6. The method as claimed in claim 3, wherein the respective communication device switches to the standby mode only after receiving a standby message from the control device.

7. The method as claimed in claim 3, wherein the respective communication device switches to the standby mode again only if the pause duration is greater than a predetermined threshold value, wherein the threshold value is statically or dynamically predefined by the control device.

8. The method as claimed in claim 1, wherein the predetermined number of other communication devices is zero.

9. The method as claimed in claim 1, wherein the respective communication device is granted access when the predetermined number of other communication devices access the communication system for a predetermined access duration.

10. The method as claimed in claim 1, wherein, when the pause duration is calculated, the respective communication device takes account of a time at which the communication device is likely to receive a message.

11. The method as claimed in claim 1, wherein the communication system comprises a control device, wherein a communication device of the plurality of communication devices is granted access to the communication medium by means of a polling message from the control unit.

12. The method as claimed in claim 1, wherein the respective communication device switches to the standby mode again only if the pause duration is greater than a predetermined threshold value.

13. The method as claimed in claim 1, wherein the communication medium comprises a bus.

14. A non-transitory computer readable medium storing a program which causes a processing unit to carry out a method as claimed in claim 1 when executed on the processing unit.

15. A communication device comprising:
   a communication interface configured to connect to a communication medium;
   an electronic processor connected to the communication interface and configured to:
   grant a plurality of communication units access to the communication medium in a predefined sequence, wherein, after an end of a standby mode, each of the plurality of communication units checks whether it is granted access to the communication medium, wherein the respective communication unit does not request access to the communication medium; and
   switch the respective communication unit of the plurality of communication units to the standby mode once more for a pause duration until the respective communication unit is likely to be granted access again, when the respective communication unit does not require access to the communication medium or it is not granted access to the communication medium, wherein the pause duration corresponds to a time duration after which the respective communication unit is granted access to the communication medium according to the predefined sequence if a predetermined number of other communication units of the plurality of communication units access the communication medium.

16. A method for operating a communication system which has a plurality of communication devices which are connected to a communication medium, the method comprising:
   granting the communication devices access to the communication medium in a predefined sequence, wherein, after the end of a standby mode, each of the plurality of communication devices checks whether it is granted access to the communication medium, wherein the respective communication device does not request access to the communication medium; and
   responsive to determining that the communication device does not require access to the communication medium or the respective communication is not granted access to the communication medium, switching the respective communication device to the standby mode for a pause duration until the respective communication device is likely to be granted access to the communication medium again, wherein the respective communication device switches to the standby mode again if the pause duration is greater than a predetermined threshold value.

* * * * *